(12) United States Patent
Boyd et al.

(10) Patent No.: US 12,555,286 B2
(45) Date of Patent: Feb. 17, 2026

(54) PRESENTATION OF MEDIA CONTENT AS MEMORIES

(71) Applicant: Snap Inc., Santa Monica, CA (US)

(72) Inventors: Nathan Kenneth Boyd, Los Angeles, CA (US); Marc Brown, New York, NY (US)

(73) Assignee: Snap Inc., Santa Monica, CA (US)

( * ) Notice: Subject to any disclaimer, the term of this patent is extended or adjusted under 35 U.S.C. 154(b) by 334 days.

(21) Appl. No.: 18/328,468

(22) Filed: Jun. 2, 2023

(65) Prior Publication Data

US 2024/0404142 A1    Dec. 5, 2024

(51) Int. Cl.
| G06T 11/60 | (2006.01) |
| G06F 3/04845 | (2022.01) |
| G06F 3/14 | (2006.01) |
| G06Q 50/00 | (2024.01) |

(52) U.S. Cl.
CPC .......... *G06T 11/60* (2013.01); *G06F 3/04845* (2013.01); *G06F 3/14* (2013.01); *G06Q 50/01* (2013.01)

(58) Field of Classification Search
None
See application file for complete search history.

(56) References Cited

U.S. PATENT DOCUMENTS

| 8,958,662 | B1 * | 2/2015 | Grosz | G06T 3/4038 |
| | | | | 382/118 |
| 10,345,987 | B1 | 7/2019 | Andreou | |
| 10,977,297 | B1 * | 4/2021 | Tang | G06F 16/4393 |
| 2005/0225647 | A1 * | 10/2005 | Gossweiler, III | G06F 16/58 |
| | | | | 348/211.3 |
| 2015/0242374 | A1 | 8/2015 | Kong et al. | |
| 2015/0287162 | A1 * | 10/2015 | Canan | G06F 16/51 |
| | | | | 345/522 |
| 2017/0308545 | A1 * | 10/2017 | Soni | G06F 16/156 |
| 2018/0077440 | A1 * | 3/2018 | Wadhera | H04N 21/8456 |
| 2019/0377586 | A1 * | 12/2019 | Faulkner | G06F 9/451 |
| 2022/0060848 | A1 * | 2/2022 | Allen | H04W 4/021 |
| 2023/0100461 | A1 | 3/2023 | Murray | |

OTHER PUBLICATIONS

"International Application Serial No. PCT/US2024/031727, International Search Report mailed Sep. 10, 2024", 4 pgs.
"International Application Serial No. PCT/US2024/031727, Written Opinion mailed Sep. 10, 2024", 4 pgs.

* cited by examiner

*Primary Examiner* — Edward Martello
(74) *Attorney, Agent, or Firm* — Schwegman Lundberg & Woessner, P.A.

(57) ABSTRACT

A system includes one or more hardware processors and at least one memory storing instructions that cause the one or more hardware processors to perform operations including retrieving a first set of a media content captured by an interaction client included in a client device, and retrieving a second set of media content captured by the interaction client included in the client device. The operations also include assigning the first set of media content a first ranking value, and assigning the second set of media content a second ranking value, creating a first visual representation of the first set of media content and a second visual representation of the second set of the second set of media content based on the first ranking value and on the second ranking value, and causing to display, on a display of the client device, the first visual representation and the second visual representation.

20 Claims, 14 Drawing Sheets

PRESENTATION OF MEDIA CONTENT AS MEMORIES

BACKGROUND

Camera systems, such as a camera disposed on a mobile device, can capture a variety of electronic images and video. The popularity of image and video capture continues to grow. Users increasingly share media content items such as electronic images and videos with each other. Users also increasingly utilize their mobile devices to communicate with each other using message programs. For example, a user can create media content and share it via a message program.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

BRIEF DESCRIPTION OF THE DRAWINGS

Figure 1:
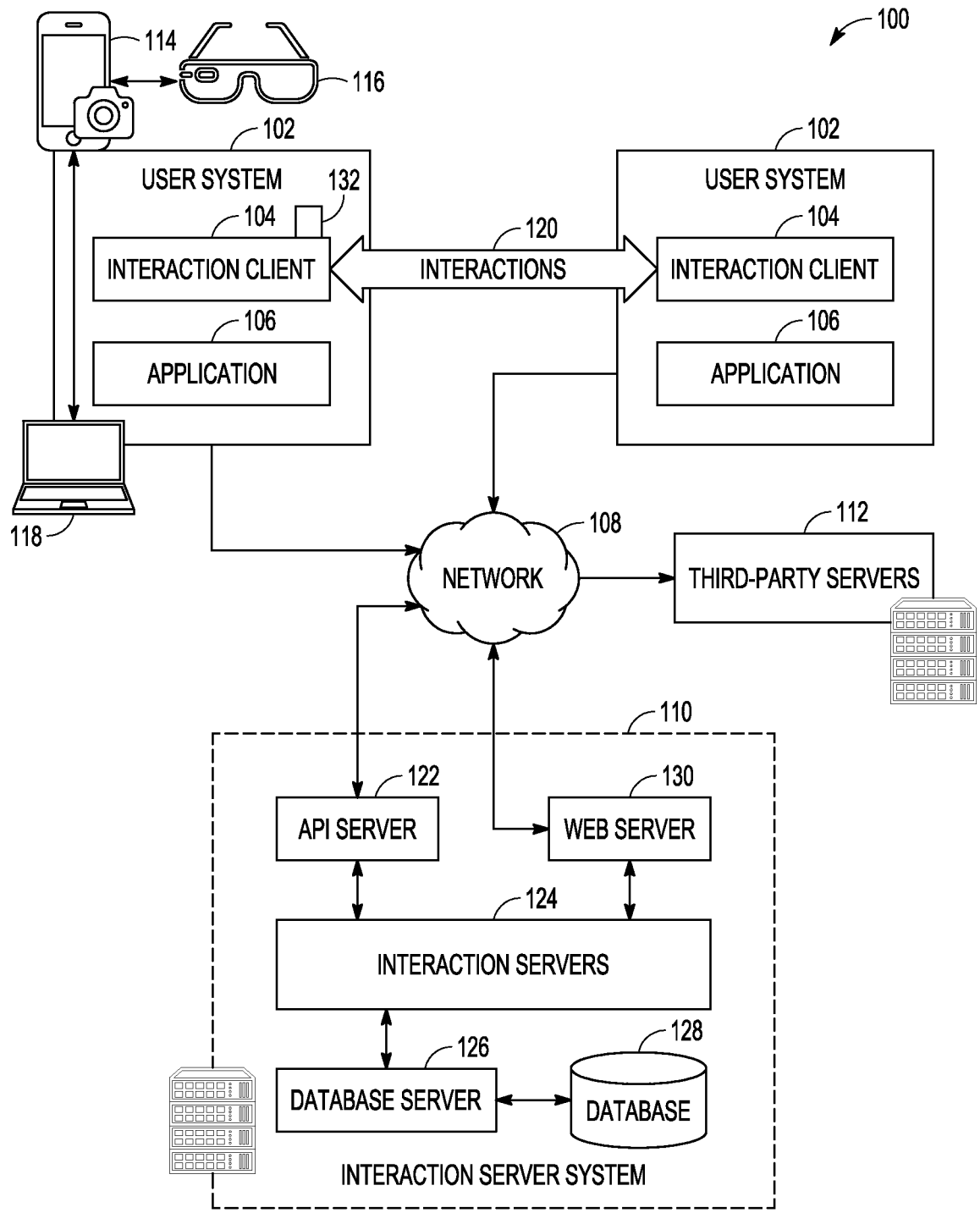

FIG. 1 is a diagrammatic representation of a networked environment in which the present disclosure may be deployed, according to some examples.

Figure 2:
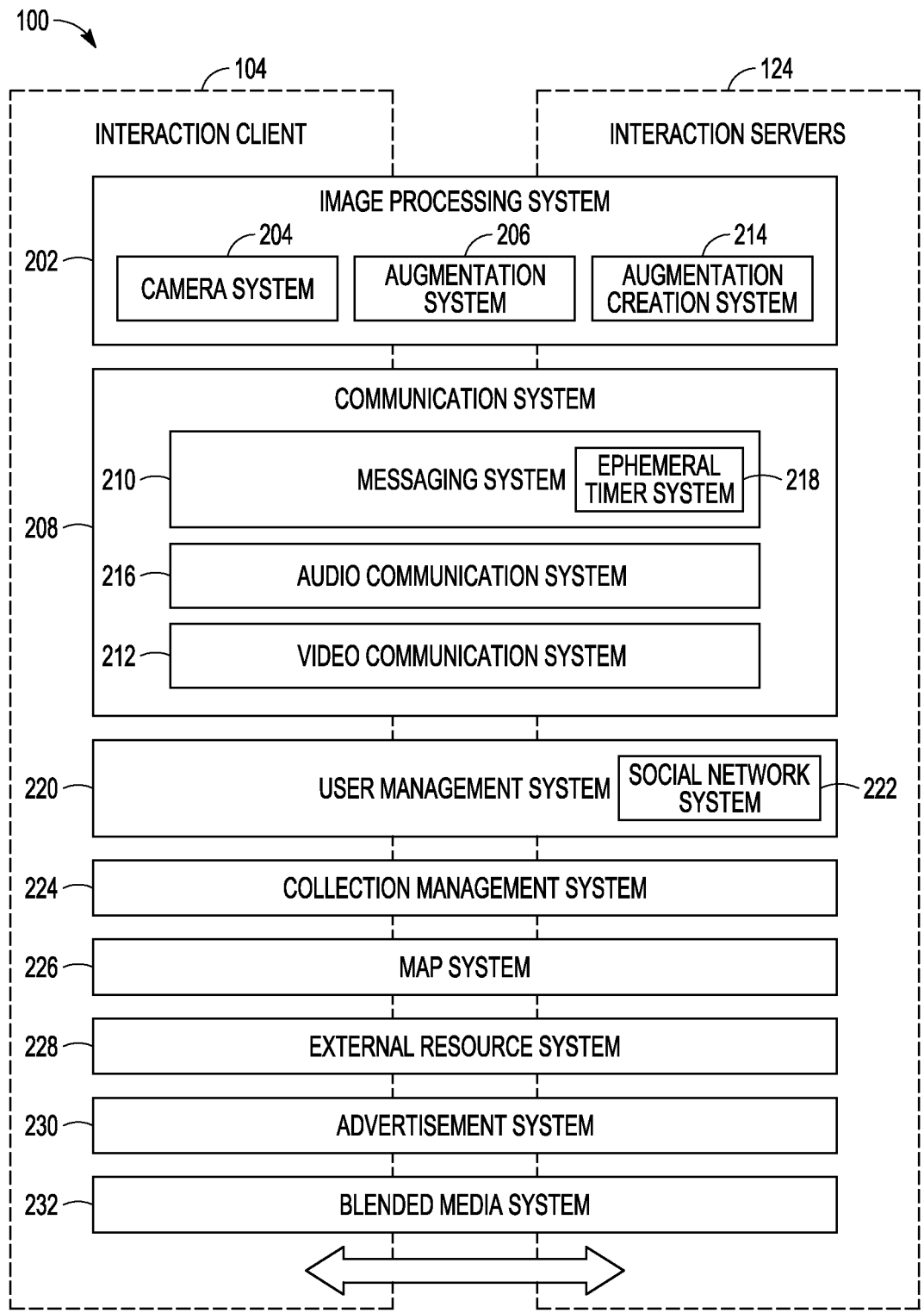

FIG. 2 is a diagrammatic representation of a messaging system, according to some examples, that has both client-side and server-side functionality.

Figure 3:
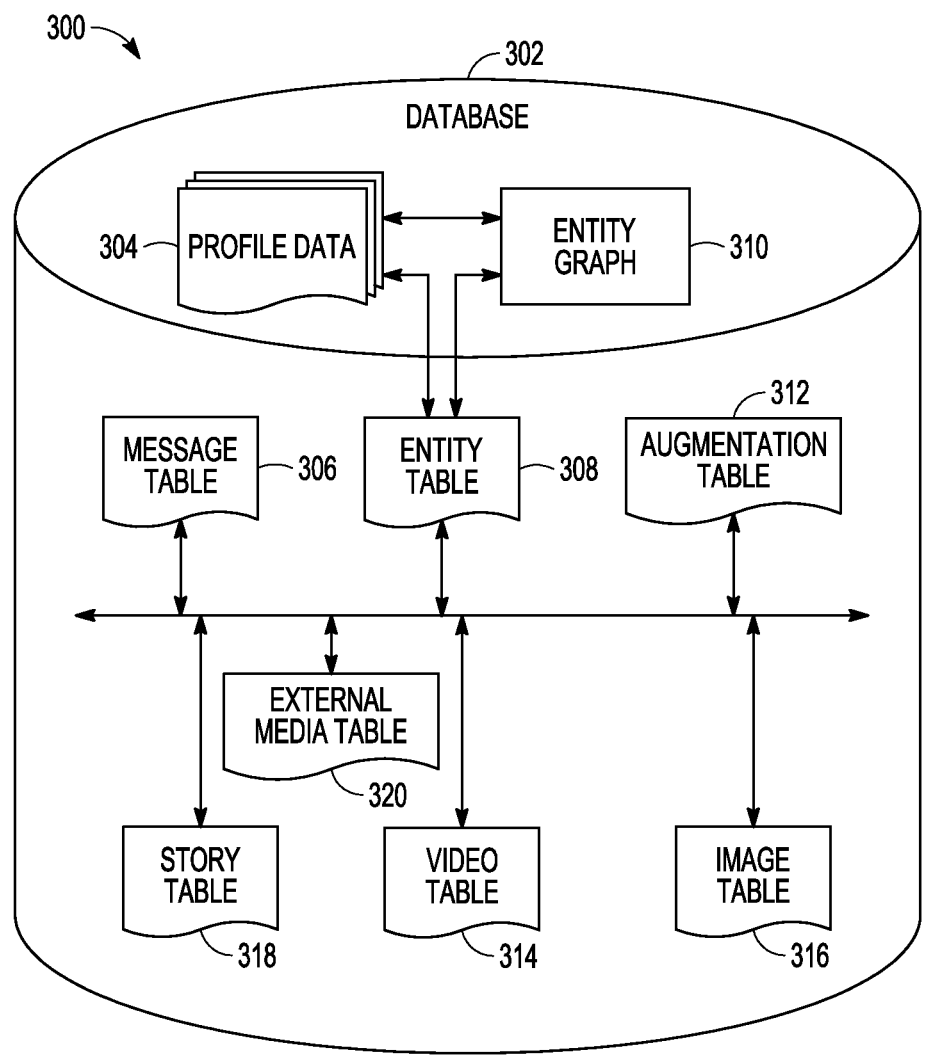

FIG. 3 is a diagrammatic representation of a data structure as maintained in a database, according to some examples.

Figure 4:
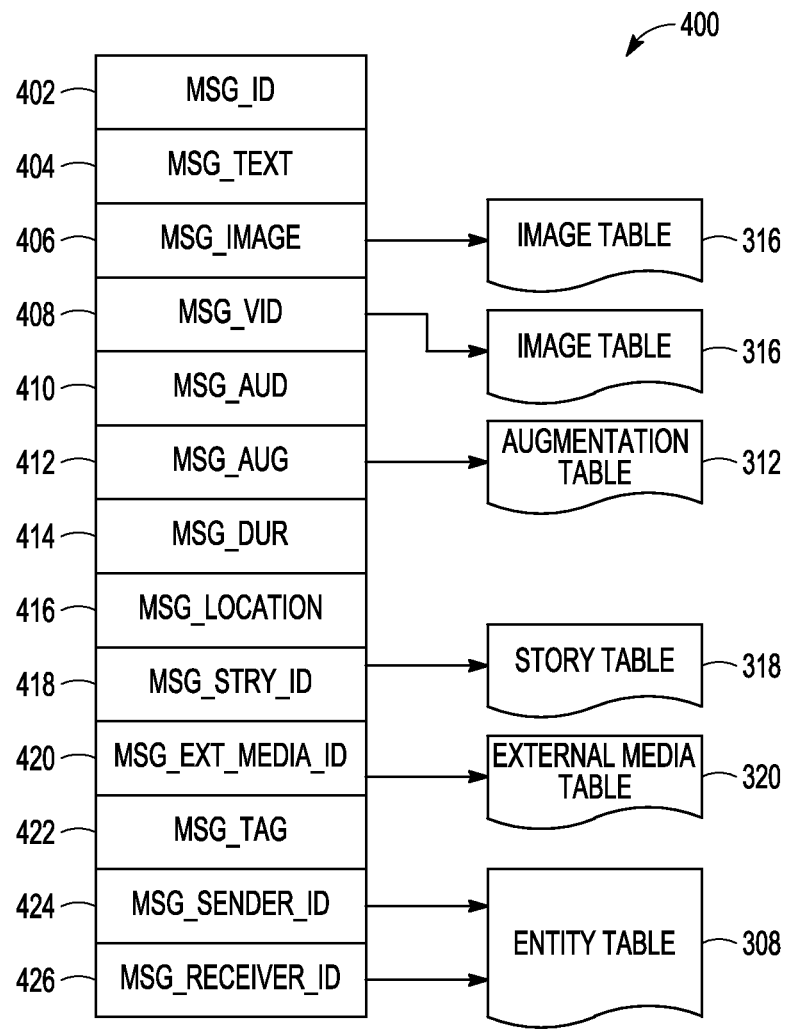

FIG. 4 is a diagrammatic representation of a message, according to some examples.

Figure 5:
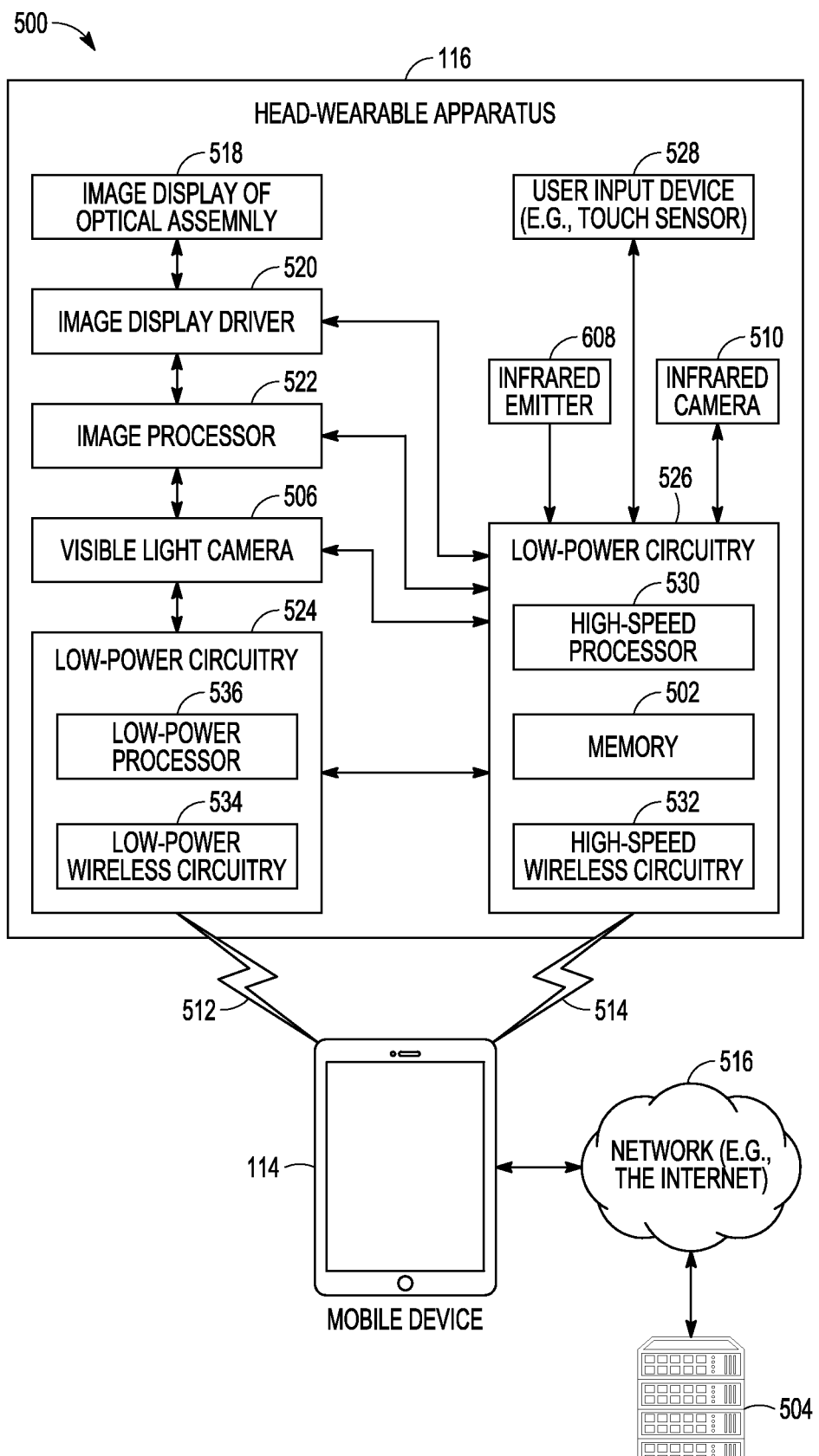

FIG. 5 illustrates a system in which the head-wearable apparatus, according to some examples.

Figure 6:
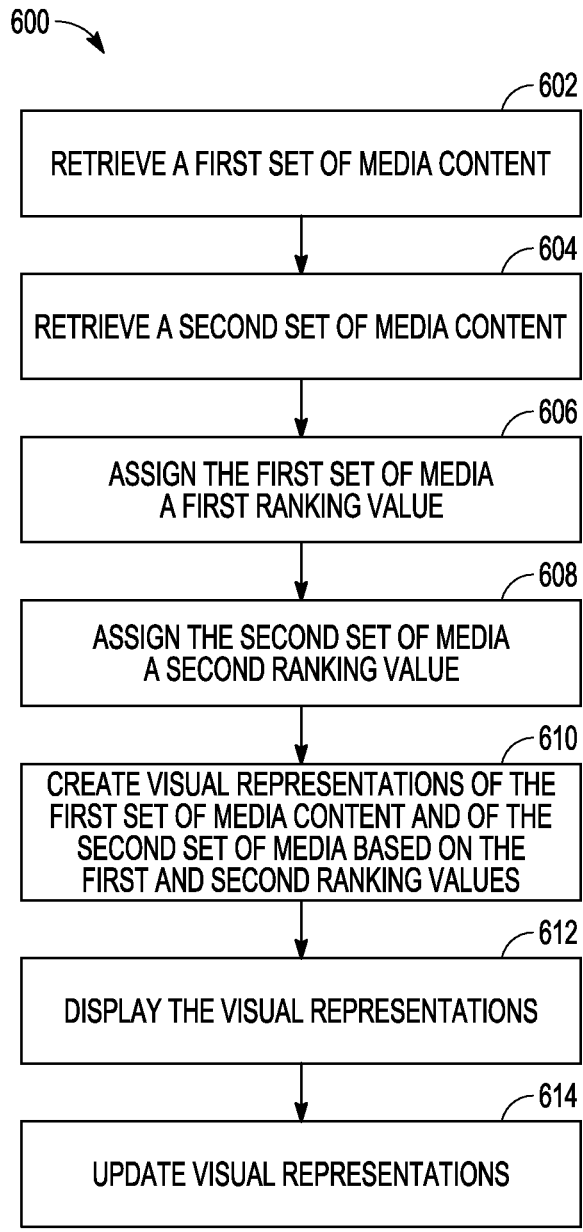

FIG. 6 illustrates a flowchart of a process for creating, ranking, and displaying visual representations of certain media content, according to some examples.

Figure 7:
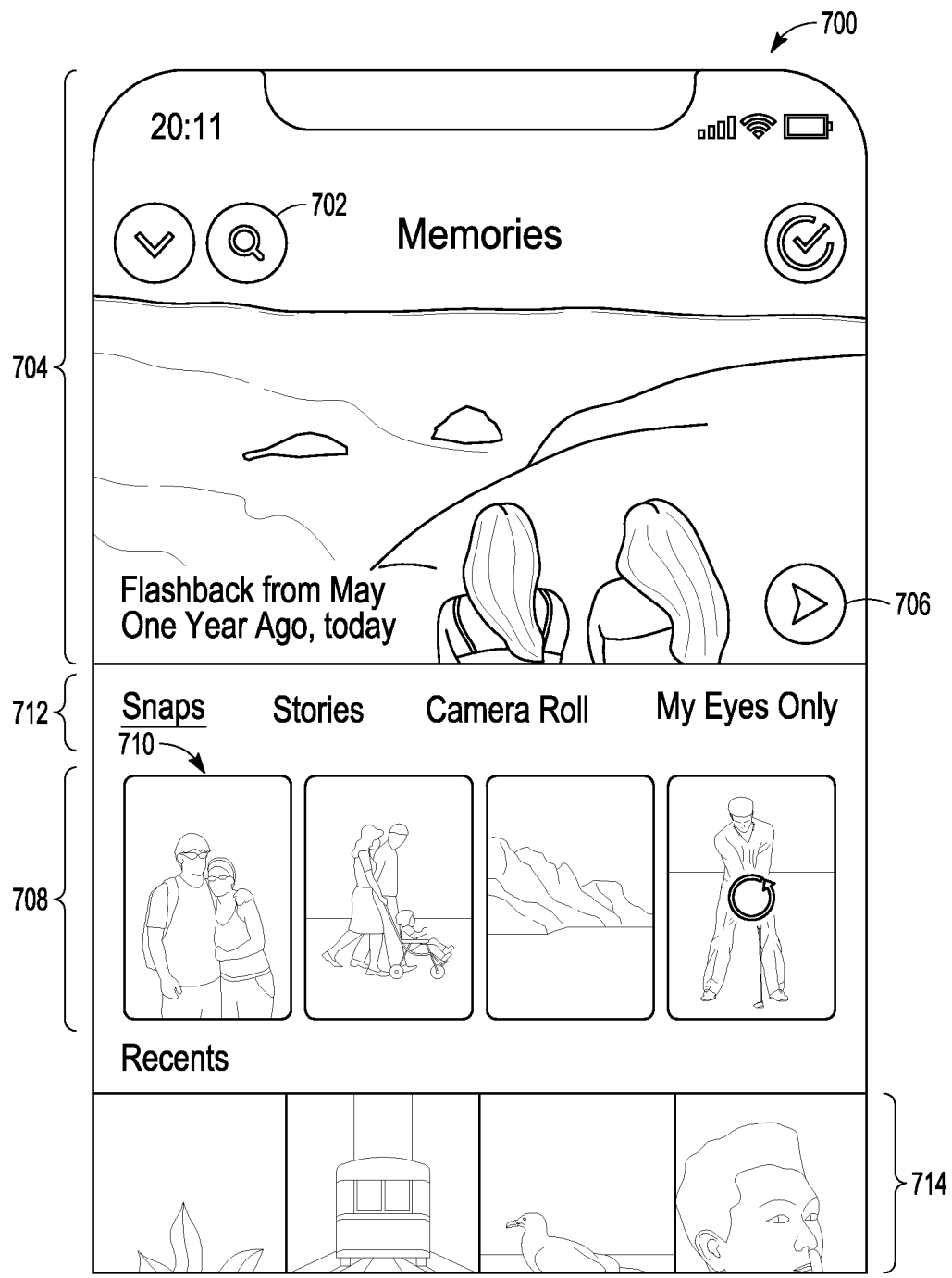

FIG. 7 a screenshot of a memories display for displaying visual representations of sets of media content, according to some examples.

Figure 8:
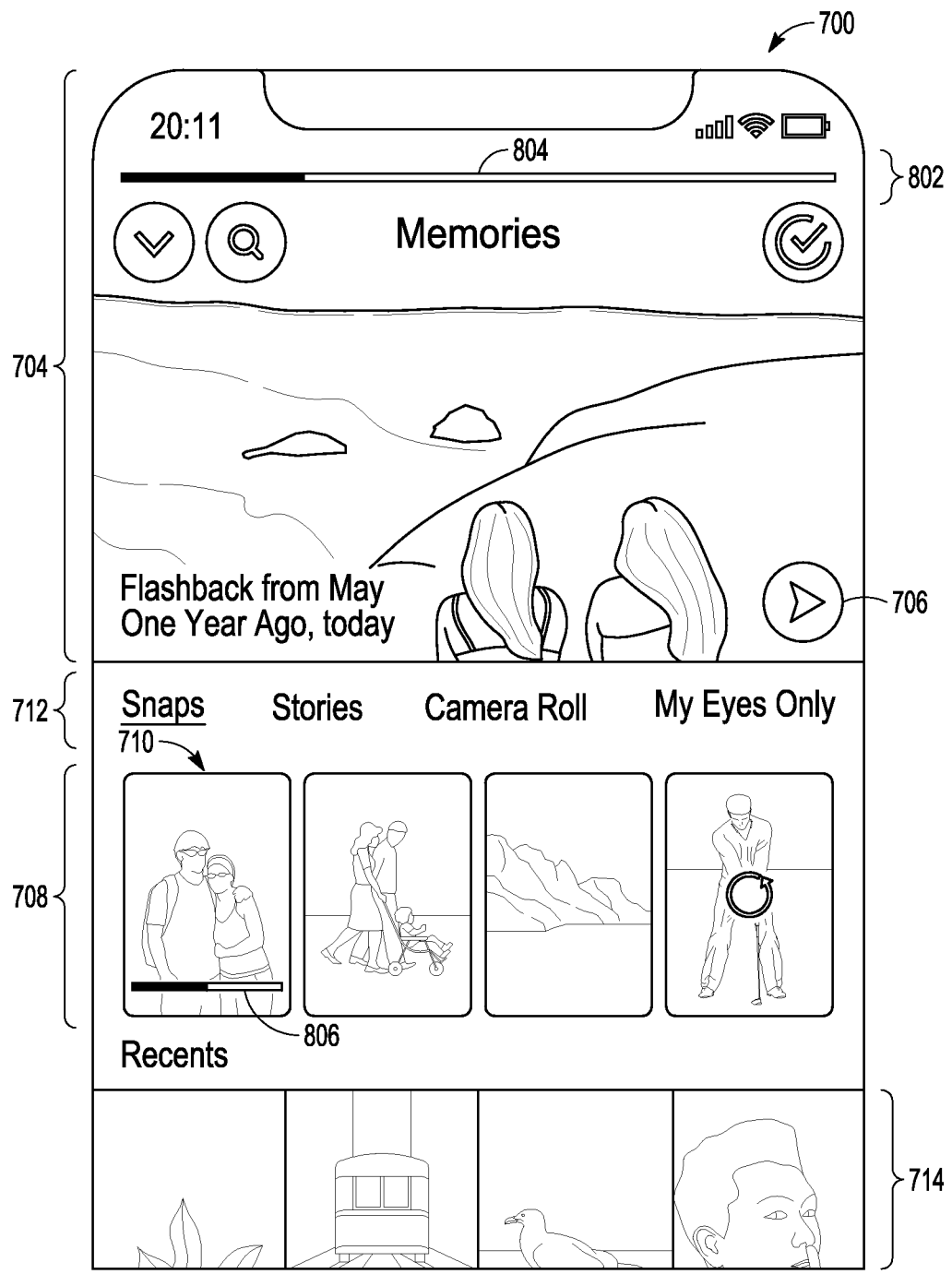

FIG. 8 illustrates a screenshot of the memories display having certain partial viewing indicia, according to some examples.

Figure 9:
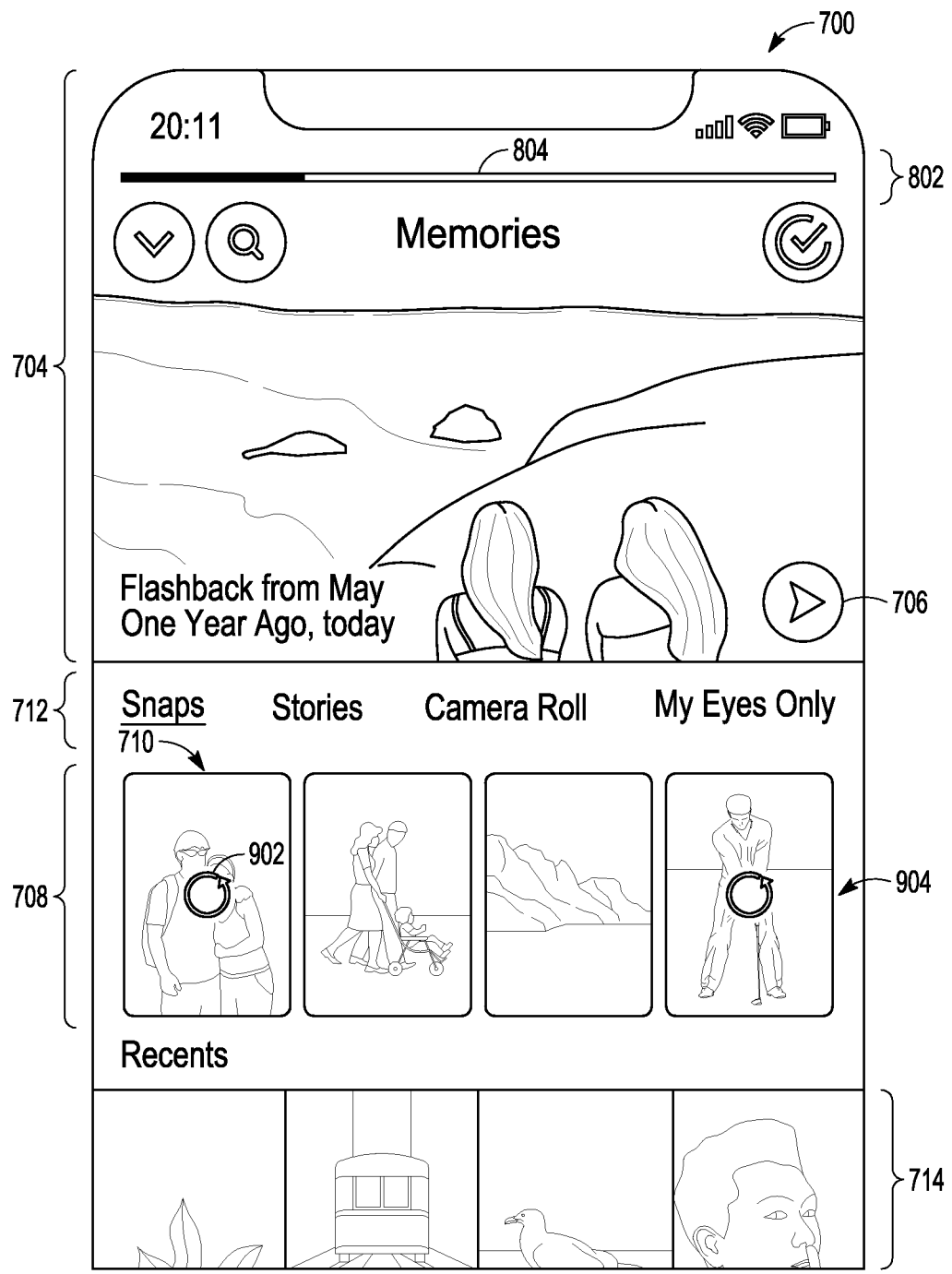

FIG. 9 illustrates a screenshot of the memories display having certain media content displaying fully viewed indicia representative of all media content items in a set of media content items having been viewed, according to some examples.

Figure 10A:
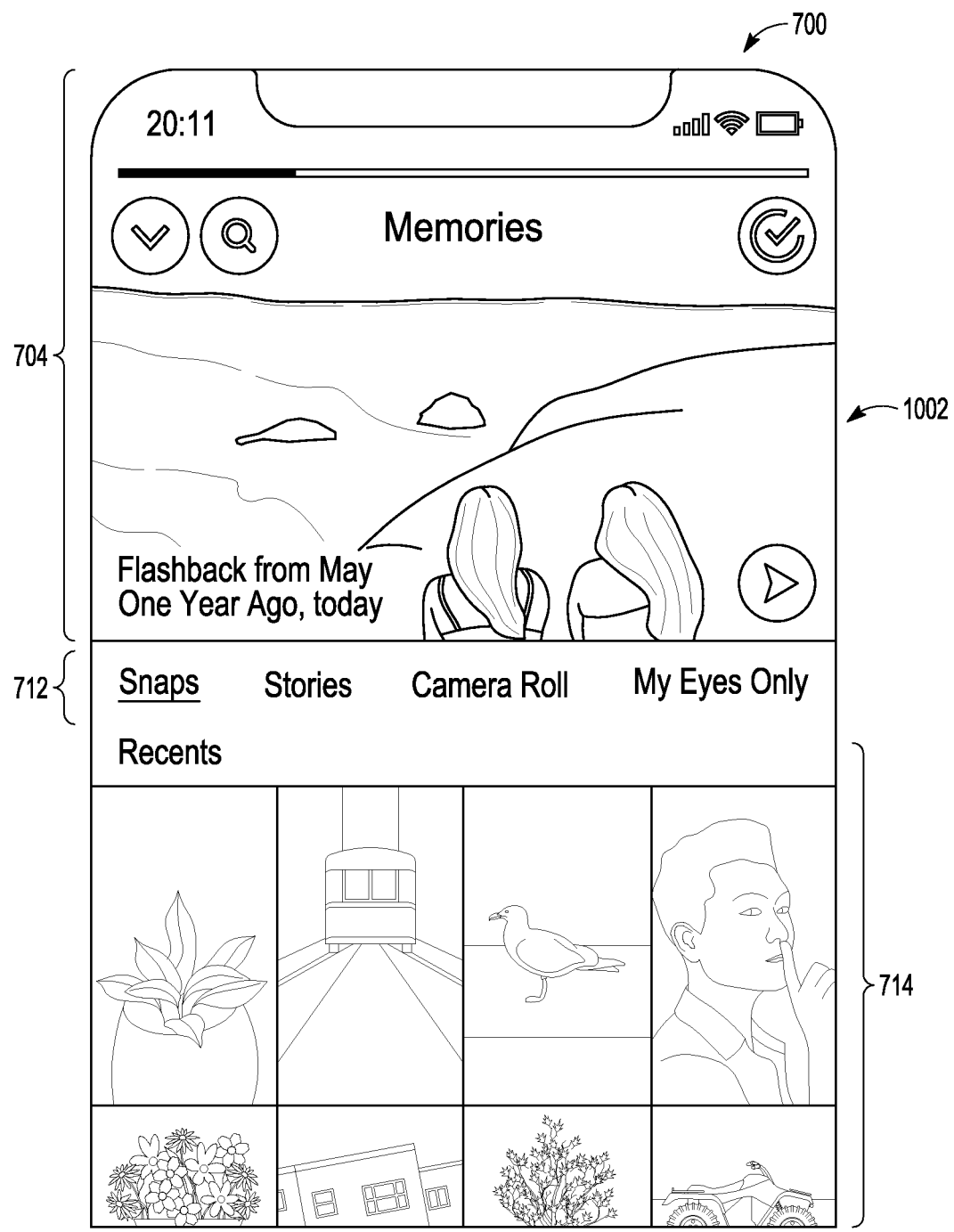

FIG. 10A illustrate an example of the memories display where a first number of visual representations of media content sets are displayed, according to some examples.

Figure 10B:
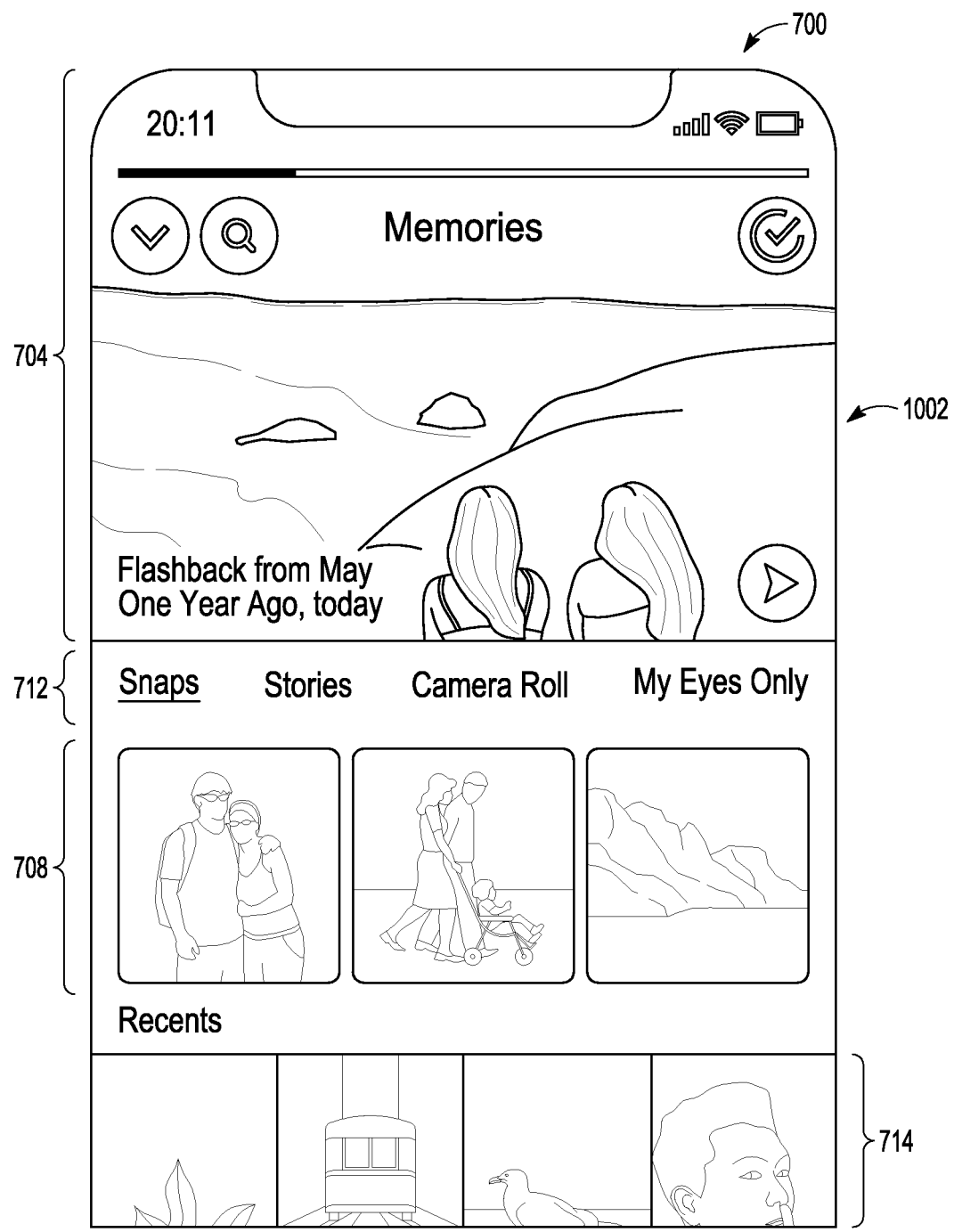

FIG. 10B illustrate an example of the memories display where a second number of visual representations of media content sets are displayed, according to some examples.

Figure 10C:
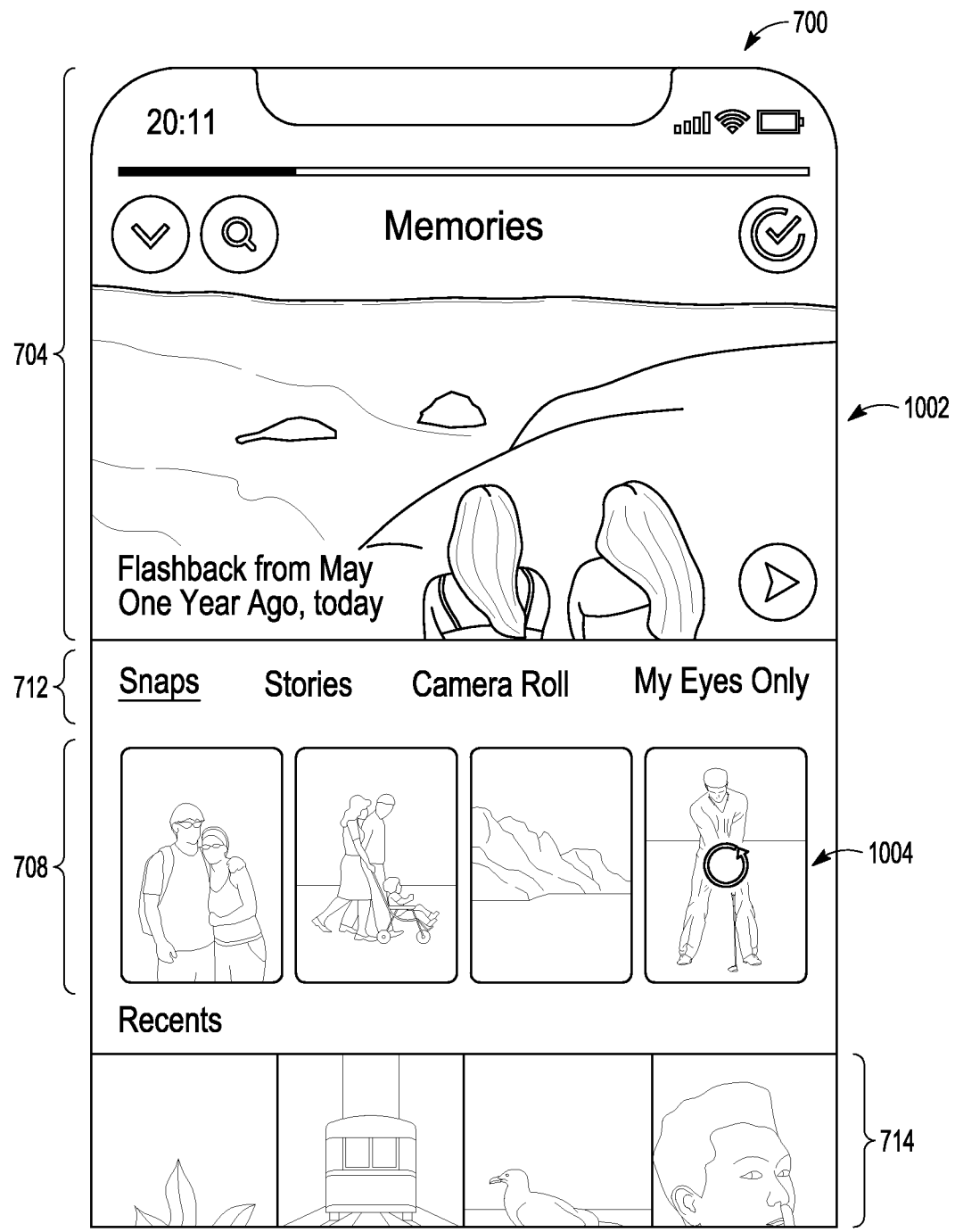

FIG. 10C illustrate an example of the memories display where a third number of visual representations of media content sets are displayed, according to some examples.

Figure 11:
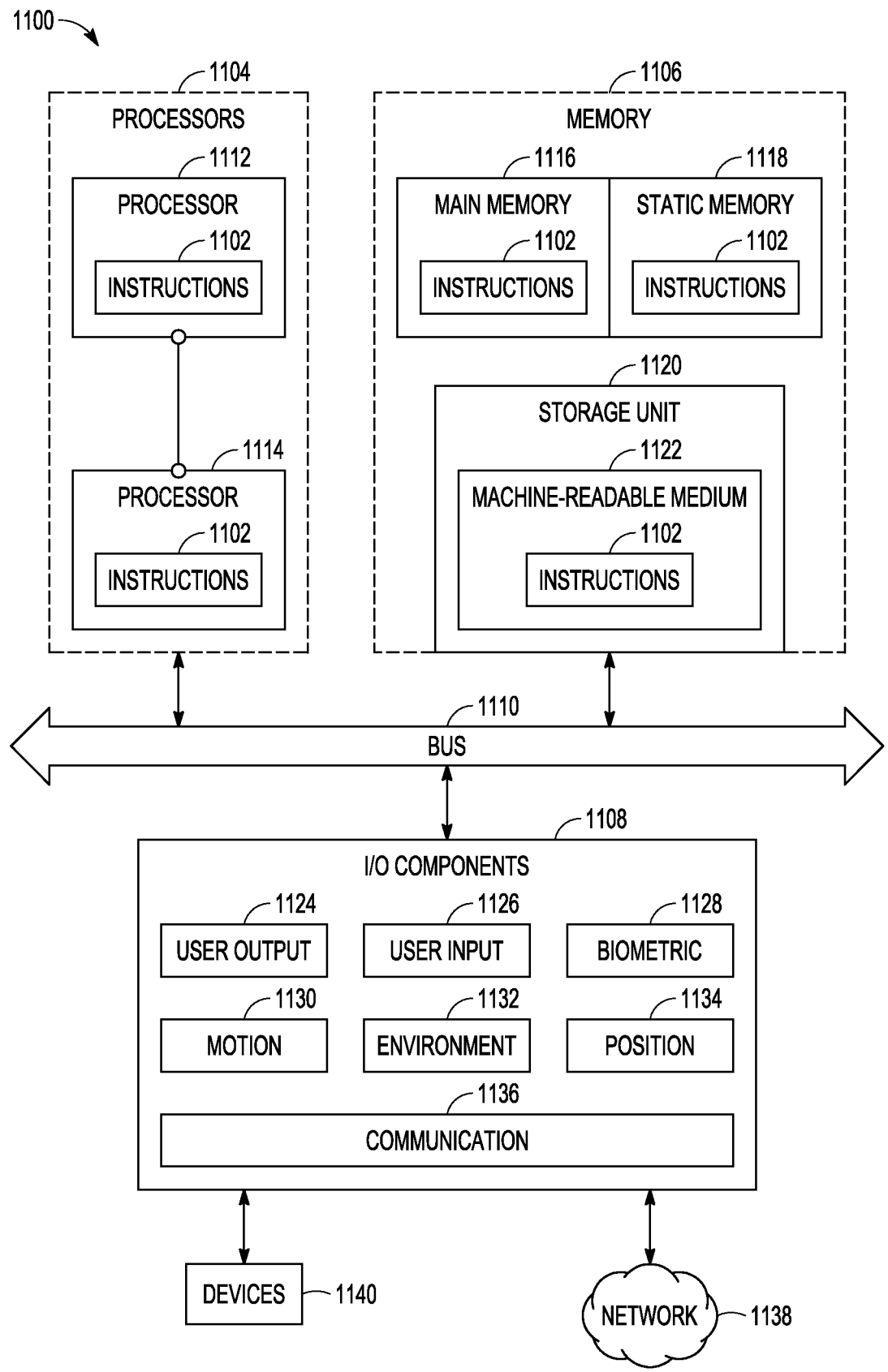

FIG. 11 is a diagrammatic representation of a machine in the form of a computer system within which a set of instructions may be executed to cause the machine to perform any one or more of the methodologies discussed herein, according to some examples.

Figure 12:
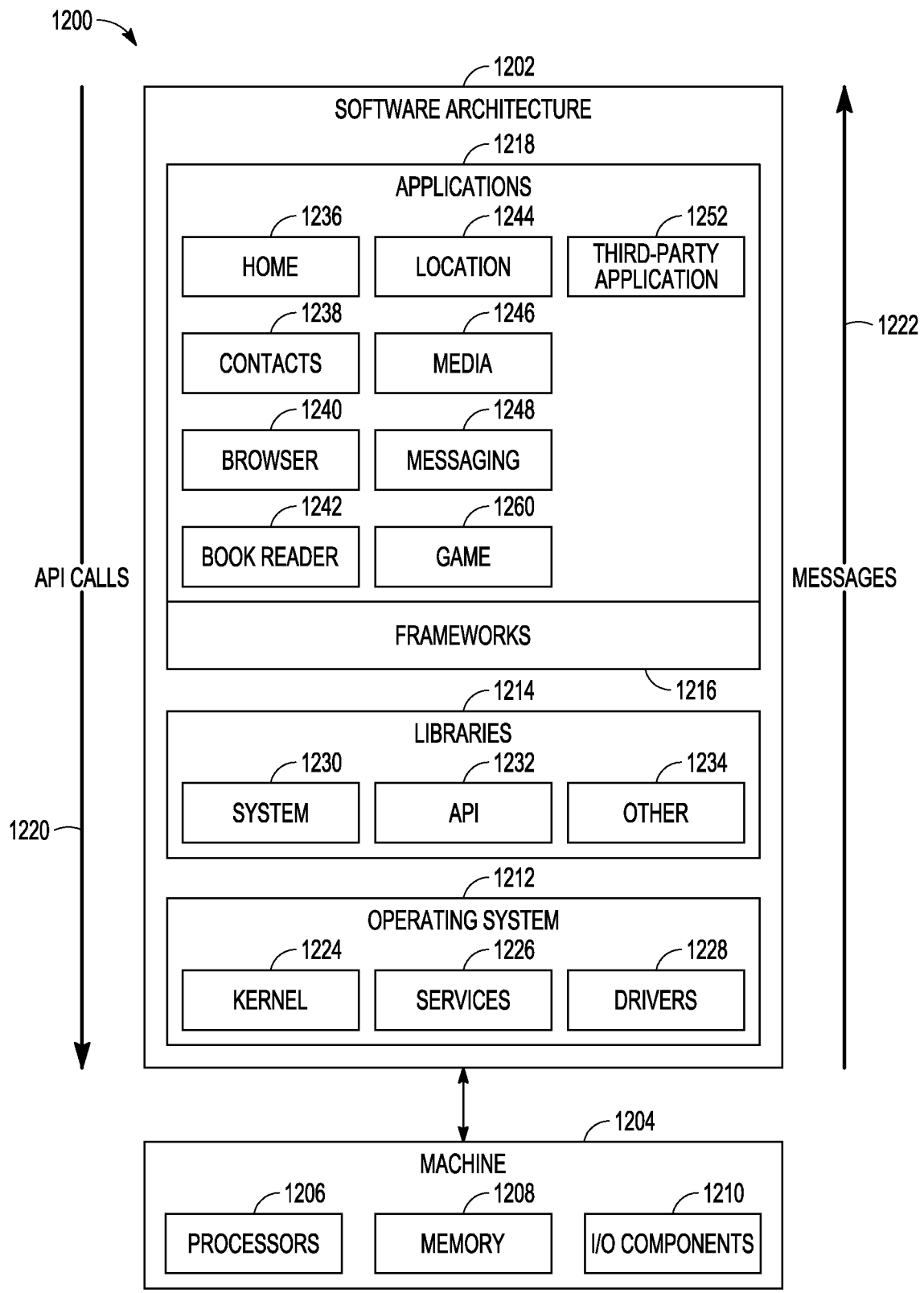

FIG. 12 is a block diagram showing a software architecture, according to some examples.

DETAILED DESCRIPTION

Camera systems are included in a variety of devices such as mobile devices, smart watches, drones, and so on. The camera systems enable a user to take images and video and are communicatively and/or operatively coupled to certain applications, such as interaction clients. In some examples, the interaction client enables a user to capture media content while using the interaction client, and to apply certain photographic filters and/or virtual lenses. The captured media is then transmitted to another user or user group via the interaction client. The messaging application also provides for the reuse of previously captured media. For example, the user may have captured the media in another application, such as a photo application executable via a mobile device, and stored the captured media in a data store (e.g., local data store, cloud-based data store) as part of a user experience, such as a vacation, a concert, or a family gathering). The techniques described herein provide for the presentation and ranking of media captured by the interaction client and media captured by other applications (e.g., photo applications) as short vignettes or "memories" all displayable in the same graphical user interface (GUI). Vignettes, as referred to herein, are a series of images or short videos that are displayed one after each other. The images or video can include media overlays, such as those created via photographic filters and virtual lenses further described below.

In certain examples, a "memories" screen is used, which presents the ranked vignettes in a single view of the interaction client. That is, rather than switching between various applications and/or screens, the interaction client can automatically retrieve media content from diverse sources (e.g., media content captured by the interaction client, media content captured by other applications executing in a client device (e.g., mobile device), and/or media content captured by external systems) to create and display one or more vignettes. Each vignette includes at least one media content item, such as a picture or a video, including a picture of a video having media overlays, that is displayed for a short duration (e.g, a number of seconds) before transitioning to another media content item, if any.

In certain examples, the vignettes are presented as ranked thumbnails. The ranking includes a ranking by engagement (e.g., number of times the vignette was viewed), by chronological order, by vignette length (e.g., a time for the vignette to completely show all media content), or a combination thereof. In one example, a top-ranked vignette is presented in a thumbnail size larger than other vignettes, thus providing for an improved visualization of ranking order and for improving user interaction. The vignettes can be created from data stores used by applications other than the interaction client, such as the camera application and/or external systems. By presenting vignettes from various sources in a more seamless manner, the techniques described herein provide for an interaction client that is more efficient and engaging in collating and communicating media from diverse sources.

Networked Computing Environment

It may be beneficial to describe certain systems that implement the techniques described herein. Turning now to FIG. 1, the figure is a block diagram showing an example interaction system 100 for facilitating interactions (e.g., exchanging text messages, conducting text audio and video calls, creating media content, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages. An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction client 104 includes a memories vignette system 132 that presents, and can communicate, media captured via the interaction client 104, other applications 106 running in the user system 102, and/or external applications. For example, the memories vignette system 132 can provide certain GUI screens, such as a "memories" screen, displaying ranked vignettes. In some examples, the memories screen can toggle (e.g., via tabs) between vignettes created from media content captured by the interaction client 104 and vignettes created from other applications (e g, camera application, application 106, and/or external systems). That is, the same page or screen can be used to dynamically redisplay a portion of the page or screen to toggle between showing vignettes created from media content captured by the interaction client 104 and vignettes created from the other applications. In some examples, vignettes can include blended media content. As referred to herein, blended media content includes pictures, video, and/or media overlays (e.g., created via a photographic filter and/or a virtual lens) that have been captured and/or produced by the interaction client 104, captured and/or produced by other applications (e.g., camera application, application 106) executable via the user system 102, and/or external applications (e.g, applications executing external to the user system 102).

The memories vignette system 132 presents various thumbnails representative of the vignettes, as further described below. The thumbnails can be ranked by applying certain criteria or "sorts." For example, an engagement sort can be used that ranks the thumbnails based on engagement ranking values for the media content included in a respective vignette. That is, the media content items aggregated into a vignette can each carry an engagement ranking value, such as how many times that media content item was viewed, a number of "likes" that the media content item has received, a number of favorites that the media content item has, and so on. In one example, the thumbnail representative of the vignette having the highest engagement ranking value is then displayed in a larger size and/or in a different position on a display. Likewise, timestamp ranking values can be used instead or the engagement ranking value or in combination with the engagement ranking value. The timestamp ranking value is higher for sets of media content having newer media content items, and the timestamp ranking value is lower for sets of media content have older media content items.

In some examples, the media content is additionally presented in a memories screen that dynamically loads the media content based on the age, such as the capture date or creation date, of the media content. For example, in addition or alternative to the engagement ranking value, the age of the media content is also used to determine which media content to display. A user can select to display media content, for example, for distribution to other user systems 102 via the interaction servers 124. The interaction servers 124 host multiple systems and subsystems, as described in more detail below with reference to FIG. 2.

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message, for example, using media content captured via a camera system 204. The camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., created via a photographic filter or a virtual lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100. A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 304) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

As mentioned above, the memories vignette system 132 provides for the display of media content organized as memory vignettes. The media content can include a first media content that has been created by the interaction client 104 alongside (e.g., in the same screen), that has been created by application (e.g., application 106) executable in the user system 102 and/or an external application (e.g., an application executable by other systems). In some examples, a first screen, such as a memories screen, is used to see blended media that has been saved by the user of the interaction client 104. That is, in one default mode of operations, the interaction client 104 automatically deletes or otherwise removes, via the ephemeral timer system 218, media that has been captured by the user via the interaction client 104. The user can choose to keep certain media, which is then saved to be browsed by using the memories screen.

The memories screen will additionally display other media not captured by the user client 104, such as media captured via other applications (e.g., applications 106) and/or by external applications executed by systems other than the user system 102 as blended media. The blended media is automatically ordered in reverse-chronological order (e.g., newest items first). For example, the memories screen displays blended media that has been captured and/or created within the last week, month, and/or year. The memories screen is additionally searchable, thus finding blended media based on search terms such as "birthday," "picnic," "zoo," and so on, as well as finding blended media based on calendar dates.

A "recents" section of the memories screen is also provided by the memories vignette system 132, which automatically displays blended media based on certain triggering conditions. For example, the recents section displays blended media based on a count of how many blended media items have been saved within a time period. In one example, if 4 or more blended media items have been saved within the last 24 hours then the recents section will show the blended media items saved. It is to be understood that any number of saved blended media items and any time period (e.g., 1 hour, 12 hours, two days) can be used for the triggering conditions.

By providing for one or more screens, such as the above-mentioned memories screen and recents section, which display media from a variety of sources alongside each other, the techniques described herein enable a more efficient presentation of media to be used, for example, for messaging purposes. The user of the memories vignette system 132 can more easily visualize and navigate media captured and/or created by a variety of systems and applications in one screen, and can then select diverse media, for example, to message other users.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth. An advertisement system 230 operationally enables the purchasing of advertisements by third parties for presentation to end-users via the interaction clients 104 and also handles the delivery and presentation of these advertisements.

Data Architecture

FIG. 3 is a schematic diagram illustrating data structures 300, which may be stored in the database 302 of the interaction server system 110, according to certain examples. While the content of the database 302 is shown to comprise multiple tables, it will be appreciated that the data could be stored in other types of data structures (e.g., as an object-oriented database).

The database 302 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e g , referentially) to an entity graph 310 and profile data 304. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g, work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 304 stores multiple types of profile data about a particular entity. The profile data 304 may be selectively used and presented to other users of the interaction system 100 based on privacy settings specified by a particular entity. Where the entity is an individual, the profile data 304 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 304 for the group may similarly include one or more avatar representations associated with the group, in addition to the group name, members, and various settings (e.g., notifications) for the relevant group. The database 302 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 302 also include an external media table 320 storing links to media not captured by the interaction client 104. For example, the links include links to images and video captured by the camera application running in the user system 102, other applications 106, as well as external systems and stored in cloud-based systems. In one example, the user may give the interaction client 104 permission to access local media stored by other applications (e.g., the camera application) in a "camera roll" or similar storage area. The "camera roll" includes media stored locally (e.g., in storage included in the user system 102), as well as externally, e.g., in the database 128, including cloud-based storage. Accordingly, the memories vignette system 132 can access media from diverse storage locations for various purposes, including display purposes.

Data Communications Architecture

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 302, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message external media identifier 420: identifier values identifying one or more media stored by systems or applications other than the interaction client 104

Message tag 422: each message 400 may be tagged with multiple tags, each of which is indicative of the subject matter of content included in the message payload. For example, where a particular image included in the message image payload 406 depicts an animal (e.g., a lion), a tag value may be included within the message tag 422 that is indicative of the relevant animal. Tag values may be generated manually, based on user input, or may be automatically generated using, for example, image recognition.

Message sender identifier 424: an identifier (e.g., a messaging system identifier, email address, or device identifier) indicative of a user of the user system 102 on which the message 400 was generated and from which the message 400 was sent.

Message receiver identifier 426: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 424 and the message receiver identifier 426 may point to user records stored within an entity table 308.

System with Head-Wearable Apparatus

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be, for example, a visible light camera 506, an infrared emitter 508, and an infrared camera 510.

The mobile device 114 connects with bead-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 528 (e.g., touch sensor or push button), including an input surface on the head-wearable apparatus 116. The user input device 528 (e.g., touch sensor or push button) is to receive from the user an input selection to manipulate the graphical user interface of the presented image.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects. The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WiFi. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502. The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and a network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532. The head-wearable apparatus 116 is used to capture and/or display media content, including media displayed by the memories vignette system 132.

Memories Vignette System

FIG. 6 illustrates a flowchart of a process 600 for creating, ranking, and displaying visual representations (e.g., vignettes) of certain media content, according to some examples. In the illustrated example, the process 600 retrieves, at block 602, a first set of media content. For example, the first set media content includes content captured and/or created by the interaction client 104, by applications other than the interaction client 104, such as a camera application included in the user system 102, by other applications 106, by external systems, or by a combination thereof. Accordingly, the first set of media content can include a set of text, images, video, and/or media overlays. The media overlays include content that has been created, for example, via a photographic filter and/or a virtual lens. The photographic filter can capture image and/or video data and transform the data by overlaying text, animations, geolocation information, time information, and so on. The virtual lens can transform image and/or video to add augmented reality components, such as by transforming a video selfie of a person's face into the face of another person, transforming the person's face into a comic book character's face, adding cat ears to the person's face, and so on. The virtual lens can also overlay text, animations, geolocation information, time information, and so on. The first set of media content can include one or more media content items, such as text, video, and/or media overlays.

In some examples, the first set of media content can be retrieved based on a chronological order, a geographic location, or a combination thereof. In one example, the chronological order can include a reverse-chronological order with newer media content being retrieved first. For example, the process 600 can retrieve, as part of the selection of the first set of media content, media content that has been saved by the interaction client 104 within the last day, last week, last month, last year, last few years, or a combination thereof. The capture date or time of creation for the media content is thus the date the media content was saved. Likewise, a geographic location can be used to retrieve media associated with the geographic location or within a certain distance from the geographic location. The geographic location can include business establishments (e.g, restaurants, entertainment venues, shops, malls) and other locations (e.g., outdoor parks, state parks, concert venues). Accordingly, the first set of media content can be used to create a vignette that displays the first set of media content one after another as part of a memory, a story, a camera roll collection, and a private media collection, as further described below.

The process 600 additionally retrieves, at block 604, a second set of media content. The second set of media content is also retrieved to create a vignette as described with respect to the first set of media content. Accordingly, the second set of media content includes content captured and/or created by the interaction client 104, by applications other than the interaction client 104, such as a camera application included in the user system 102, by other applications 106, by external systems, or by a combination thereof. As in the first set of media content, the second set of media content can include a set of text, images, video, and/or media overlays.

In some examples, the second set of media content can be retrieved based on a chronological order, a geographic location, or a combination thereof. In one example, the chronological order can include a reverse-chronological order with newer media content being retrieved first. For example, the process 600 can retrieve, as part of the selection of the second set of media content, media content that has been saved by the interaction client 104 within the last day, last week, last month, last year, last few years, or a combination thereof. The capture date or time of creation for the media content is thus the date the media content was saved or created, for example, with a media editor. Likewise, a geographic location can be used to retrieve media content associated with the geographic location or within a certain distance from the geographic location.

The process 600 then assigns, at block 606, a first ranking value to the first set of media content, and at block 608, a second ranking value to the second set of media content. Ranking values for sets of media content items include an engagement ranking value, a timestamp ranking value, or a combination thereof. In certain examples, the engagement ranking value for a set of media content is based on a number of times that the media content items members of the set of media content have been viewed and/or how recently the media content items has been viewed, by a first and/or by a second user. That is, the same media content may be viewed by a first user using a first client device and/or by a second user using a second client device and the rankings are then computed to accommodate views by both users (or more users) together. The timestamp ranking value is higher for sets of media content having newer media content items, and the timestamp ranking value is lower for sets of media content have older media content items.

The engagement ranking value is higher for sets of media content having media content items that have not been viewed or that have been partially viewed by the user when compared to sets of media content having media content items that have been fully viewed. In some examples, a general impression demotion process occurs for engagement ranking values, such that if a set of media content is displayed for viewing but is not viewed after certain number of displays (e.g., the set of media content is displayed 3 times or more on the client systems 102), then the set of media content has its engagement ranking value demoted by lowering the engagement ranking value. Accordingly the engagement ranking value can go down, as well as up.

The process 600 then creates, at block 610, visual representations of the first set of media content and of the second set of media content based on the first ranking value and the second ranking value. For example, the set of media content having the highest ranking values will have a visual representation created that has a larger size when compared to visual representations of other sets of media content having lower ranking values. The visual representation of the set of media content having the highest or largest ranking values will also be placed more prominently such as in its own row of a visual display. The ranking values will also be used to create a visual ordering of sets of media content when there are multiple sets of media content. In one example, a row of visual representations of the sets of media content is ordered left-to-right with the set of media content having the highest ranking value (e.g., timestamp ranking, engagement ranking, or a combination thereof) placed at the leftmost location of the row.

The process 600 then displays, at block 612, the visual representations for the sets of media content that have been ranked. For example, the visual representations created dynamically are displayed via a GUI in one or more rows based on ranking values. The GUI enables a user to select the visual representation (e.g., vignette) of the set of media content to "play" one or more media content in the set. In some examples, a first media content item in the set of media contents is displayed for a given period of time (e g, 5 seconds) before transitioning to a second media content item in the set of media content, which is then displayed for the given period of time before transitioning to a third media content item in the set of media content, and so on.

In some examples, each visual representation of a set of media content includes a visual indicia representative of how many media content items have been visualized. For example, a bar is displayed as part of the visual representation for each media content item, that includes color, transparency, and/or shading to indicate that the corresponding media content item has been viewed or not viewed. In some examples, the bar is a progress bar, which can visually indicate how much time is left before transitioning to viewing another media content item. Accordingly, the processes 600 updates, at block 614, the visual representations of the first and/or the second sets of media content by updating the bars, sizes of the visual representations, ordering of the visual representations, adding new visual representations, removing existing visual representations, and so on. In some examples, a visual representation having a timestamp older than an expiration date is removed and no longer displayed. The expiration date can be a date range older than the current date, such as one week older than the current date, one month older than the current date, and so on.

It is also to be noted that while a first and a second sets of media content items are shown as being retrieved and then used to display corresponding visual representations in FIG. 6, any number of sets of media content can be retrieved for display of visual representations. That is, the process 600 can retrieve any number of sets of media content, assign each set a ranking value, create visual representations of the sets, display the visual representations, and then update the visual representations as previously described. It may be beneficial to illustrate example screenshots of certain visual representations of sets of media content, as described in more detail below.

FIG. 7 illustrates a screenshot of a memories display 700 for displaying visual representations of sets of media content, according to some examples. The memories display 700 is d in a GUI of the interaction client 104. In the depicted example, the memories display 700 includes a search control 702. The search control 702 is used to enter search terms for blended media content. For example, terms such as "birthday," "picnic," "concert," and so on, can be entered via the search control 702. The memories display 700 will then display media content found based on the search. The memories display 700 additionally includes a section 704, which is shown displaying a visual representation (e.g., thumbnail) of a set of media content representative of a time period (e.g., pictures, video, and/or media overlays one year previous in the month of May) when the media content was taken. In one example, the user can begin viewing of media contents items of the set of media content items by activating, for example, a control 706. In some examples, the viewing of the media content items in section 704 may begin automatically when the memories display 700 is displayed. That is, the user may open the interaction client 104 and navigate to the memories display 700, which then causes the automatic "playback" of the media content items in section 704.

A section 708 is also shown, which is used to display additional visual representations of sets of media content. As mentioned earlier, each visual representation is given a ranking value, such as an engagement ranking value, a timestamp ranking value, or a combination thereof. The engagement ranking value for a set of media content is based on a number of times that the media content items members of the set of media content have been viewed and/or how recently the media content items has been viewed. The timestamp ranking value is higher for sets of media content having newer media content items, and the timestamp ranking value is lower for sets of media content have older media content items.

In the depicted embodiment, section 704 displays the visual representation of the set of media content that has the highest engagement ranking value, the highest timestamp value, or the combination thereof. Accordingly, the visual representation shown in section 704 is shown by itself and in a larger size when compared to other visual representations shown, for example, in section 708. Indeed, visual representations of sets of media content having lower engagement ranking values, timestamp ranking values, or combinations thereof, are then displayed in section 708. It is to be noted that while section 708 is shown as having a single row in the depicted example, section 708 can have multiple rows. A row in section 708 is ordered based on ranking values. In the specific example shown, a leftmost visual representation (e.g., thumbnail) 710 of a set of media content has the next highest ranking values, thus presenting a ranked left-to-right ordering of visual representations of sets of media content. That is, a first visual representation in section 708 that is in the same row but to the left of a second visual representation will have a higher engagement ranking value and/or timestamp ranking value than the second visual representation. Additionally, a visual representation in a row above will have higher engagement ranking values and/or timestamp ranking values than visual representations in rows below.

A tabs section 712 can be used to navigate to other functionality, such as to "stories" to visualize and edit story content, "camera roll" to visualize and edit media content captured via a camera application, and/or "my eyes only" for media content that is kept private and protected via a password. In the depicted example, a recents section 714 is also illustrated. The recents section 714 displays thumbnails of media content items based on certain triggering conditions. For example, the recents section 714 displays media content based on a count of how many media content items have been saved within a time period, such as 4 or more media content items saved within the last 24 hours. It is to be understood that any number of saved media content items and any time period (e.g., 1 hour, 12 hours, two days, and so on) can be used for the triggering conditions. If the triggering conditions are not met, then the recents section 714 is not shown. In the depicted embodiment of the memories display 700, all media content in sections 704 and 708 is unviewed. Once certain media content is partially viewed, such as by viewing some but not all items in a set of media content items, partially viewed indicia is shown to illustrate the partial viewing of the media content items, as shown in FIG. 8.

FIG. 8 illustrates a screenshot of the memories display 700 having certain partial viewing indicia, according to some examples. More specifically, section 704 includes a subsection 802 that displays visual indicia of a total number of media content items available for viewing in section 704, as well as how many media content items have been viewed. In the depicted example, rectangular bars are used in subsection 802 as partial viewing indicia that certain media content items have been viewed by the user of the user system 102. In the depicted example, four rectangular bars are shown in subsection 802, each rectangular bar representing a media item in the set of media items viewable via section 704. A first rectangular bar 804 is shown as having a different color or shade (e.g., white) from the remainder rectangular bars in subsection 802. In the depicted example, the color or shade of the first rectangular bar 804 is representative of a first media content item having been viewed by the user of the user system 102. The remaining three rectangular bars in the depicted example are shown in a different color or shade (e.g., gray) representative of three media content items that have not yet been viewed.

Also illustrated is a partial viewing indicia 806 used to represent that one or more media content items displayable via the thumbnail 710 have been viewed. In the illustrated example, the partial viewing indicia 806 is depicted as a single progress bar having approximately 50% progress. Accordingly, there is approximately 50% left to view the media content displayable via the thumbnail 710. As more media content is viewed, the partial viewing indicia 806 will be updated to reflect the additional media content viewing until all media content is viewed. Once all media content is viewed, visual indicia representative of fully viewing all media content items is displayed, as described in more detail with respect to FIG. 9.

FIG. 9 illustrates a screenshot of the memories display 700 having certain media content displaying fully viewed indicia representative of all media content items in a set of media content items having been viewed, according to some examples. More specifically, subsection 802 is now showing all four progress bars in subsection 802 as having the same color or shade as progress bar 804, thus denoting that all media content items of the set viewable in section 704 have now been fully viewed. For media content items shown in thumbnails in section 708, when all media content item(s) for a thumbnail are viewed, the thumbnail is then "grayed out" and an icon 902 is placed on a center of the thumbnail. For example, thumbnail 710 now has been fully viewed. Accordingly, the thumbnail 710 is displayed as "greyed out" and the icon 902 is placed. In certain examples, activating the thumbnail by tapping on the icon 902 is used to replay the media content items for a thumbnail as desired. In the depicted embodiment, thumbnails 710 and 904 are both shown as having all media content items in their respective sets of media content items now viewed.

FIG. 10A-10C illustrate examples of the memories display 700 where a varying number of visual representations (e.g., thumbnails) of media content sets are displayed, according to some examples. More specifically, FIG. 10A illustrates an example of the memories display 700 where a single visual representation (e.g., thumbnail) 1002 of a set of media content is displayed. The remainder of the memories display 700 then shows the tabs section 712 and the recents section 714. The memory display 700 can dynamically change positioning and display of its various sections, for example, when more visual representations of sets of media content are to be shown.

FIG. 10B shows an example of the memories display 700 when a total of four visual representations of sets media content are to be shown, according to some examples. In the depicted example, section 708 is now displayed, showing a total of three visual representations (e.g., thumbnails) of sets of media content additional to visual representation 1002 displayed in section 704. The memories display 700 also shows the tabs section 712 and the recents section 714. In the depicted example, the virtual representation 1002 is shown in a larger size than virtual representations shown in section 708 due to the virtual representation 1002 having a higher ranking value (e.g., engagement ranking value and/or timestamp ranking value) when compared to the virtual representations shown in section 708. As mentioned above, in one example, section 708 displays its virtual representations of sets of media content in a left-to-right order such that the leftmost virtual representation has the next highest ranking value after virtual representation 1002. As more virtual representations of sets of media content are added, the section 708 will dynamically change to add and/or remove virtual representations, as described in more detail below with respect to FIG. 10C.

FIG. 10C illustrates the memory display 700 having multiple visual representations of sets of media content, according to some examples. More specifically, the example depicted in FIG. 10C shows five visual representations of sets of media content, including the visual representation 1002. As mentioned earlier, the section 708 can resize the visual representations of sets of media content based on how many visual representations are to be displayed. In the depicted example, the visual representations displayed by section 708 in FIG. 10C are each shown in a size smaller when compared to the visual representations displayed by section 708 in FIG. 10B. Indeed, the section 708 can resize visual representations to be larger or smaller based on how many visual representations are to be displayed. Further, the section 708 can include any number of visual representations for display.

In the depicted example, four full visual representations (e.g., thumbnails) are shown, and a portion 1004 of a visual representation is shown by the section 708. The portion 1004 is shown because the entirety of the visual representation is too large to be displayed in full. To see the rest of the visual representation and not only the portion 1004, the user can use a gesture such as a left-to-right swipe and the section 708 can then display further visual representations. That is, the section 708 may be a "carousel" control in which gestures or other user inputs cause the control to move and redisplay thumbnails in a left-to-right and/or right-to-left fashion. By resizing the visual representations of sets of media content, and by placing the visual representations at certain locations (e.g., sections 704, 708) based on ranking values (e.g., engagement ranking values and/or timestamp ranking values), the techniques described herein provide for a more efficient and engaging presentation and selection of media content.

Machine Architecture

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies (e.g., processes 600) discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O) components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e g, one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e g, Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

CONCLUSION

Technical advantages include automatically deriving music and sound recommendations by selecting a photographic filter or a virtual lens. The music and sound recommendations are contextual, providing for recommendations based on date/times, based on machine learning models, based on interrelationships between media, based on non-machine learning models, or a combination thereof. For example, photographic filters and virtual lenses in combination with certain music may be proving popular as part of a friends group, and the machine learning model can detect the popularity and aid a user to participate in the new trend.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm) In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Interaction client" refers, for example, to an application executable via client device that includes interactions such as messages being sent among a group of users. The messages can include media content.

"Machine storage medium" refers, for example, to a single or multiple storage devices and media (e.g., a centralized or distributed database, and associated caches and servers) that store executable instructions, routines and data. The term shall Accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A system, comprising:
one or more hardware processors; and
at least one memory storing instructions that cause the one or more hardware processors to perform operations comprising:
retrieving a first set of a media content captured by an interaction client included in a client device;
retrieving a second set of media content captured by the interaction client included in the client device;
determining a first ranking value for the first set of media content and a second ranking value for the second set of media content based on one or more of engagement data and timestamp data;
creating a first visual representation of the first set of media content and a second visual representation of the second set of the second set of media content based on the first ranking value and on the second ranking value;
causing to display, on a display of the client device, the first visual representation and the second visual representation;
detecting one or more of new engagement data and new timestamp data;
determining a third ranking value for the first set of media content and a fourth ranking value for the second set of media content based on the new engagement data and the new timestamp data; and
causing the first visual representation and the second visual representation to update based on the third ranking value and the fourth ranking value.

2. The system of claim 1, wherein assigning the first set of media content the first ranking value comprises deriving a first timestamp ranking value and assigning the first timestamp ranking value as the first ranking value, and wherein assigning the second set of media content a second ranking value comprises deriving a second timestamp ranking value and assigning the second timestamp ranking value as the second ranking value.

3. The system of claim 2, wherein deriving the first timestamp ranking value comprises deriving a first time of creation for the first set of media content, wherein deriving the second timestamp ranking value comprises deriving a second time of creation for the second set of media content, and wherein the first ranking value is ranked higher than the second ranking value when the first time of creation is newer than the second time of creation.

4. The system of claim 2, wherein assigning the first set of media content the first ranking value comprises deriving a first engagement ranking value and assigning a combination of the first timestamp ranking value and the first engagement value as the first ranking value, and wherein assigning the second set of media content a second ranking value comprises deriving a second engagement ranking value and assigning a combination of the second timestamp ranking value and the second engagement value as the second ranking value.

5. The system of claim 4, wherein deriving the first engagement ranking value comprises deriving a first number of times that the first set of media content is viewed by a user of a client device, wherein deriving the second engagement ranking value comprises deriving a second number of times that the second set of media content is viewed by the user, and wherein the first ranking value is ranked higher than the second ranking value when the first number of times that the first set of media content is viewed by the user is higher than the second number of times that the second set of media content is viewed by the user.

6. The system of claim 5, wherein deriving the first engagement ranking value comprises deriving a third number of times that the first set of media content is viewed by a second user of a second client device, and wherein deriving the second engagement ranking value comprises deriving a fourth number of times that the second set of media content is viewed by the second user, and wherein the first ranking value is ranked higher than the second ranking value when the first number of times that the first set of media content is viewed by the user added to the third number of times that the first set of media content is viewed by the second user is higher than the second number of times that the second set of media content is viewed by the user added to the fourth number of times that the second set of media content is viewed by the second user.

7. The system of claim 1, wherein creating the first visual representation and the second visual representation comprises creating the first visual representation at a size larger than the second visual representation when the first ranking value is larger than the second ranking value.

8. The system of claim 1, wherein displaying, on the display of the client device, the first visual representation and the second visual representation comprises visually positioning, in a row, the first visual representation to a left of the second visual representation when the first ranking value is larger than the second ranking value.

9. The system of claim 1, wherein the first visual representation comprises a first thumbnail representative of a first media content item in the first set of media content and wherein the second visual representation comprises a second thumbnail representative of a second media content item in the second set of media content.

10. The system of claim 9, wherein the first media content item comprises a picture, a video, a media overlay, or a combination thereof.

11. The system of claim 1, wherein the first visual representation of the first set of media content comprises a visual indicia of progress in viewing the first visual representation by a user of the client device.

12. The system of claim 11, wherein the visual indicia comprises one or more progress bars that each display a progress in viewing the first set of media content by the user of the client device.

13. The system of claim 12, wherein a total number of the one or more progress bars correspond to a total number of media content items in the first set of media content.

14. The system of claim 1, wherein the operations further comprise:
determining that the first set of media content, the second set of media content, or a combination thereof, has a timestamp older than an expiration date, and removing from the display the first visual representation, the second visual representation, or a combination thereof when the timestamp is older than the expiration date.

15. The system of claim 1, wherein the operations further comprise:
communicating the first set of media content to a second interaction client included in a second client device;
creating a third visual representation of the first set of media content and a second visual representation of the second set of the second set of media content based on the first ranking value and on the second ranking value; and
causing to display, on a display of the client device, the first visual representation and the second visual representation.

16. The system of claim 1 wherein creating the first visual representation of the first set of media content comprises communicating the second set of media content from a second interaction client included in a second client device to the interaction client and creating the first visual representation based on the communicated first set of media content.

17. The system of claim 1, wherein the engagement data comprises a number of times the first set of media content has been viewed and a number of times the second set of media content have been viewed.

18. The system of claim 1, wherein the timestamp data comprises a first timestamp and a second timestamp, wherein the first timestamp is a newer media content, and wherein the second timestamp is an older media content.

19. A method, comprising:
retrieving a first set of a media content captured by an interaction client included in a client device;
retrieving a second set of media content captured by the interaction client included in the client device;
determine a first ranking value for the first set of media content and a second ranking value for the second set of media content based on one or more of engagement data and timestamp data;
creating a first visual representation of the first set of media content and a second visual representation of the second set of the second set of media content based on the first ranking value and on the second ranking value;
causing to display, on a display of the client device, the first visual representation and the second visual representation;
detect one or more of new engagement data and new timestamp data;
determine a third ranking value for the first set of media content and a fourth ranking value for the second set of media content based on the new engagement data and the new timestamp data; and
cause the first visual representation and the second visual representation to update based on the third ranking value and the fourth ranking value.

20. A non-transitory computer-readable storage medium, the computer-readable storage medium including instructions that when executed by a computer, cause the computer to:
retrieve a first set of a media content captured by an interaction client included in a client device;
retrieve a second set of media content captured by the interaction client included in the client device;
determine a first ranking value for the first set of media content and a second ranking value for the second set of media content based on one or more of engagement data and timestamp data;

create a first visual representation of the first set of media content and a second visual representation of the second set of the second set of media content based on the first ranking value and on the second ranking value;
cause to display, on a display of the client device, the first visual representation and the second visual representation;
detect one or more of new engagement data and new timestamp data;
determine a third ranking value for the first set of media content and a fourth ranking value for the second set of media content based on the new engagement data and the new timestamp data; and
cause the first visual representation and the second visual representation to update based on the third ranking value and the fourth ranking value.

* * * * *